US010076981B2

(12) United States Patent
Dry

(10) Patent No.: US 10,076,981 B2
(45) Date of Patent: Sep. 18, 2018

(54) CLIMATE COMFORT SYSTEM FOR VEHICLE SEAT

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 14/861,575

(22) Filed: Sep. 22, 2015

(65) Prior Publication Data
US 2017/0080838 A1  Mar. 23, 2017

(51) Int. Cl.
*A47C 7/02* (2006.01)
*B60N 2/56* (2006.01)
*B60N 2/90* (2018.01)
*B60N 2/64* (2006.01)

(52) U.S. Cl.
CPC ......... *B60N 2/5678* (2013.01); *B60N 2/646* (2013.01); *B60N 2/914* (2018.02)

(58) Field of Classification Search
CPC ....... B60N 2/5678; B60N 2/914; B60N 2/646
USPC .............................. 297/452.1–452.65, 216.13
See application file for complete search history.

(56) References Cited

U.S. PATENT DOCUMENTS

| | | | | |
|---|---|---|---|---|
| 5,791,736 A * | 8/1998 | Herbert | ................. | A47C 7/022 297/452.21 |
| 5,887,304 A * | 3/1999 | von der Heyde | .... | A47C 21/044 5/423 |
| 5,975,629 A | 11/1999 | Lorbiecki | | |
| 6,045,155 A | 4/2000 | Cech et al. | | |
| 6,056,079 A * | 5/2000 | Cech | ................. | B60N 2/002 177/144 |
| 6,058,341 A | 5/2000 | Myers et al. | | |
| 6,726,285 B2 * | 4/2004 | Caruso | .................... | A47C 1/03 297/452.21 |
| 6,817,675 B2 * | 11/2004 | Buss | .................... | B60N 2/5635 297/180.11 |
| 8,777,320 B2 * | 7/2014 | Stoll | ................. | B60H 1/00285 297/180.1 |
| 9,139,118 B2 * | 9/2015 | Berroth | ................ | B60N 2/5635 |
| 2003/0030319 A1 * | 2/2003 | Clapper | .................... | A47C 4/54 297/452.41 |
| 2005/0184565 A1 * | 8/2005 | Weiss | .................... | B60N 2/5635 297/180.15 |
| 2007/0176471 A1 * | 8/2007 | Knoll | .................... | B60N 2/5635 297/180.14 |

(Continued)

FOREIGN PATENT DOCUMENTS

WO    9831992 A1    7/1998

*Primary Examiner* — Syed A Islam
(74) *Attorney, Agent, or Firm* — Vichit Chea; Price Heneveld LLP

(57) ABSTRACT

A vehicle seating assembly includes a frame. A cushion assembly includes a plurality of closed base cells disposed on the frame. Each base cell includes a fixed volume of fluid disposed therein. A plurality of trim cells are disposed on the base cells and include a variable volume of fluid disposed therein. The trim cells are in communication with a fluid pump. A coverstock is disposed over the trim cells. The trim cells further define a plurality of apertures configured to communicate air between a climate control system and a seating surface of the coverstock.

20 Claims, 9 Drawing Sheets

(56) References Cited

U.S. PATENT DOCUMENTS

| | | | |
|---|---|---|---|
| 2009/0102250 A1* | 4/2009 | Wolfe, IV | B60N 2/5614 297/180.15 |
| 2010/0207443 A1 | 8/2010 | Brncick | |
| 2010/0289302 A1* | 11/2010 | Cheng | B60N 2/002 297/180.12 |
| 2011/0227389 A1* | 9/2011 | Gomes | B60N 2/5635 297/452.43 |

\* cited by examiner

CLIMATE COMFORT SYSTEM FOR VEHICLE SEAT

FIELD OF THE DISCLOSURE

The present invention generally relates to a cushion assembly for a vehicle seat, and more particularly to a climate comfort system for a vehicle seat.

BACKGROUND OF THE DISCLOSURE

Vehicle seat comfort has become increasingly important as passengers travel for longer periods of time. Providing air ventilation and cushion support in the seat through a climate control system can increase the comfort of passengers.

SUMMARY OF THE DISCLOSURE

According to one aspect of the present disclosure, a vehicle seating assembly includes a frame. A cushion assembly includes a plurality of closed base cells disposed on the frame. Each base cell includes a fixed volume of fluid disposed therein. A plurality of trim cells are disposed on the base cells and include a variable volume of fluid disposed therein. The trim cells are in communication with a fluid pump. A coverstock is disposed over the trim cells. The trim cells further define a plurality of apertures configured to communicate air between a climate control system and a seating surface of the coverstock.

According to another aspect of the present disclosure, a cushion assembly includes a plurality of closed base cells. An anti-jounce cell is disposed below the base cells proximate a rear portion of the cushion assembly. A plurality of open trim cells are disposed on the base cells and are in communication with a fluid pump. A coverstock is disposed over the trim cells. The trim cells further include ventilation apertures in communication with a seating surface of the coverstock.

According to yet another aspect of the present disclosure, a cushion assembly includes a plurality of closed base cells disposed on a frame. Each base cell includes a fixed volume of fluid disposed therein. A plurality of open trim cells are disposed on the base cells and are in communication with a fluid pump. A coverstock is disposed over the trim cells. The trim cells further include ventilation apertures configured to move air proximate a seating surface of the coverstock.

According to still another aspect of the present disclosure, a cushion assembly is provided that includes variable firmness and adjustability to accommodate occupants of different sizes. The cushion assembly incorporates cells configured to receive fluid. The spacing between the cells is configured to accommodate ventilation apertures that allow for air movement proximate a seating surface of the cushion assembly. The cushion assembly can be easily manufactured at low costs.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
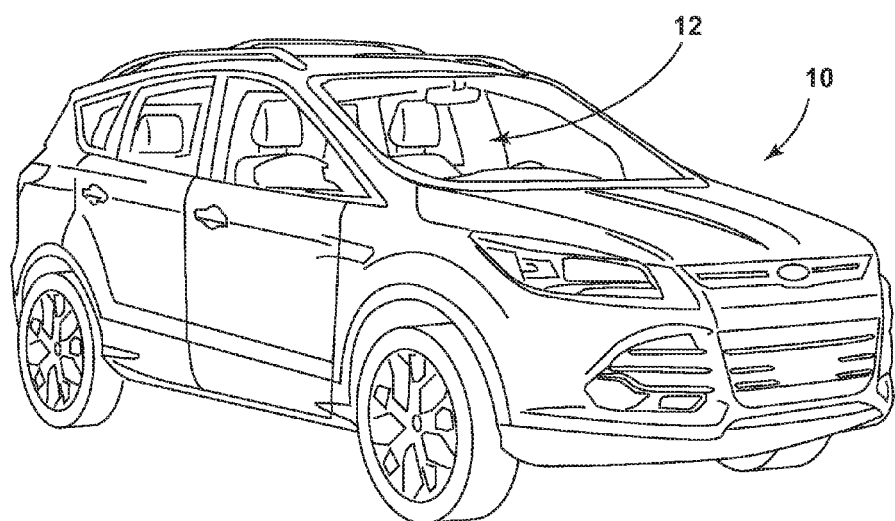
FIG. 1 is a top perspective view of a vehicle incorporating one embodiment of a vehicle seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-14, reference numeral 10 designates a vehicle that includes a vehicle seating assembly 12 having a frame 14. A cushion assembly 16 includes a plurality of closed base cells 18 disposed on the frame 14. Each base cell 18 includes a fixed volume of fluid 20 disposed therein. A plurality of trim cells 22 are disposed on the base cells 18 and include a variable volume of fluid 24 disposed therein. The trim cells 22 are in communication with a fluid pump 26. A coverstock 28 is disposed over the trim cells 22. The trim cells 22 further define a plurality of apertures 30 configured to communicate air between a climate control system 32 and a seating surface 34 of the coverstock 28.

Figure 2:
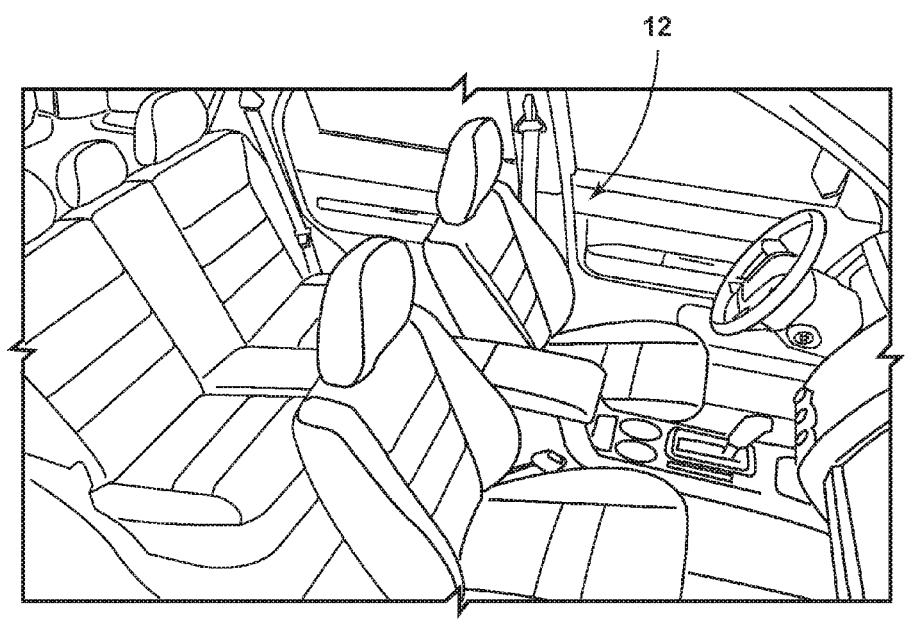
FIG. 2 is a top perspective view of a vehicle seating arrangement of the present disclosure.
Figure 2A:
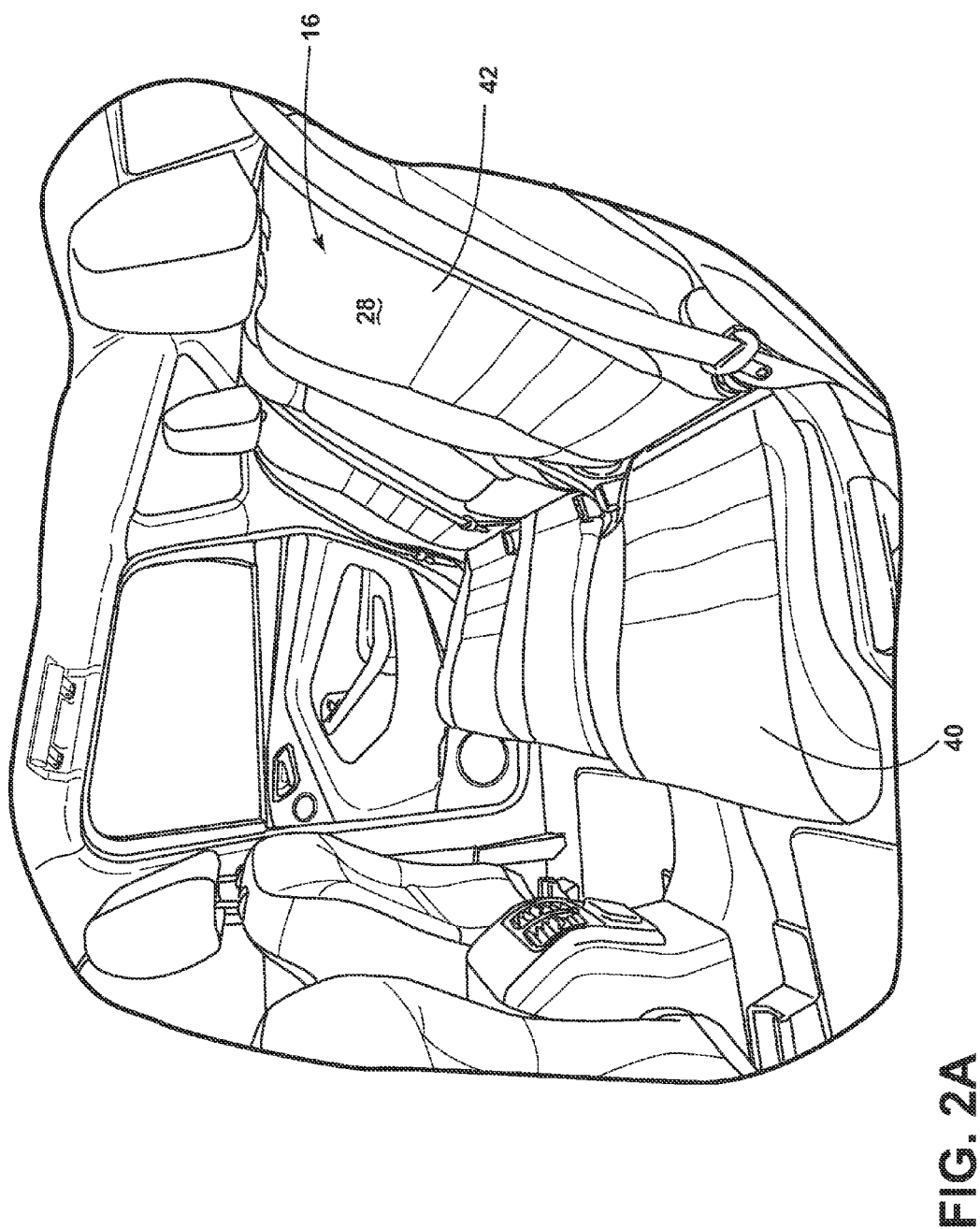
FIG. 2A is a side perspective view of a vehicle seating assembly of the present disclosure.

With reference now to FIG. 2A, the cushion assembly 16 is generally configured for use on both a seat 40 and a seatback 42 of the vehicle seating assembly 12. However, it will be understood that the configuration, as illustrated, can vary and can be used in bench seating arrangements, bucket seating arrangements, etc. It will be understood by one having ordinary skill in the art that the illustrated seat is for a rear seat application. However, it will also be understood that the same seat construction could also be applied in front seat applications.

Figure 3:
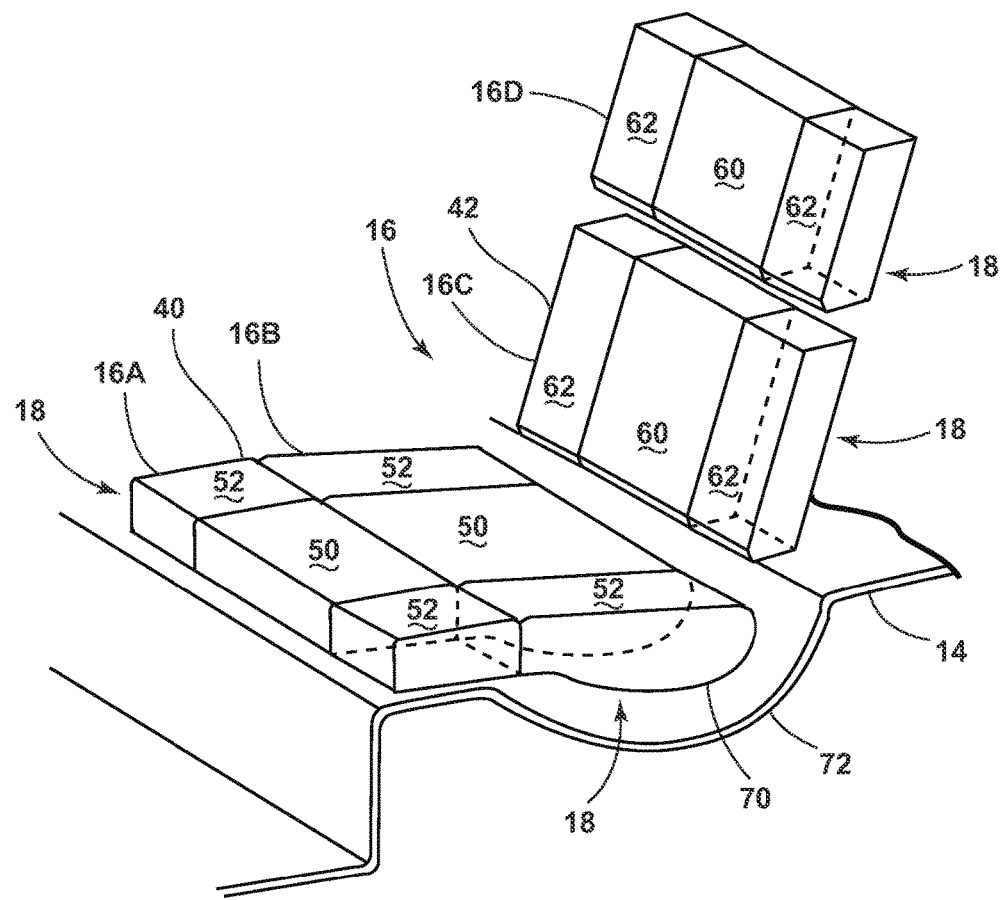
FIG. 3 is a top perspective view of one embodiment of a vehicle seating assembly of the present disclosure.

As illustrated in FIG. 3, the cushion assembly 16 is generally divided into four fluid filled seat support elements. Specifically, the cushion assembly 16 includes a forward seat support element 16A, a rearward seat support element 16B, a lower seatback support element 16C, and an upper seatback support element 16D. Each seat support element 16A, 16B, 16C, and 16D is subdivided into multiple base cells 18. The seat support element 16A includes forward base cells and seat support element 16B includes rearward base cells. Likewise, the seat support element 16C includes lower base cells and the seat support element 16D includes upper base cells. This configuration ensures that all seat surfaces remain firm under local compression. Stated differently, when the cushion assembly 16 receives the weight of a passenger, the fluid inside the base cells 18 is not distributed to the extremities of the cushion assembly 16, but rather because of the division of the cushion assembly 16 into the seat support elements 16A, 16B, 16C, and 16D and further divided into the base cells 18, relative pressures in the cushion assembly 16 can be maintained. Although 12 total base cells 18 are shown between the seat 40 and the seatback 42, it will be understood that more or less base cells 18 could also be applied to the seat 40 and the seatback 42 to provide the necessary support, depending on the desired application. Notably, the rearward seat support element 16B of the seat 40 is larger than the forward seat support element 16A. Likewise, the lower seatback support element 16C of the seatback 42 is larger than the upper seatback support element 16D. In addition, the base cells 18 of the seat 40 are generally divided into central base cells 50 and side base cells 52 with the central base cells 50 being slightly larger than the side base cells 52. Likewise, the base cells 18 of the seatback 42 are divided into central base cells 60 and side base cells 62. However, it will be understood that all of the base cells 18 could include the same width or depth, and that the illustrated embodiment is exemplary and should not be construed as limiting. Indeed, in another embodiment, all of the base cells 18 include the same size and volume, and in yet another embodiment, the side base cells 52, 62 are larger than the central base cells 50, 60 of either or both of the seat 40 and the seatback 42. In addition, it will be noted that rear base cells 18 of the reward seat support element 16B include a greater depth than the base cells 18 of the forward seat support element 16C. The base cells 18 of the rearward seat support element 16B include a rounded lower wall 70 that generally conforms to a rounded, arcuate, or scalloped portion 72 of the frame 14. It will be understood that the frame 14 could take on a variety of constructions, and that the base cells 18 of the seat 40 are generally configured to conform to the frame 14.

Figure 4A:
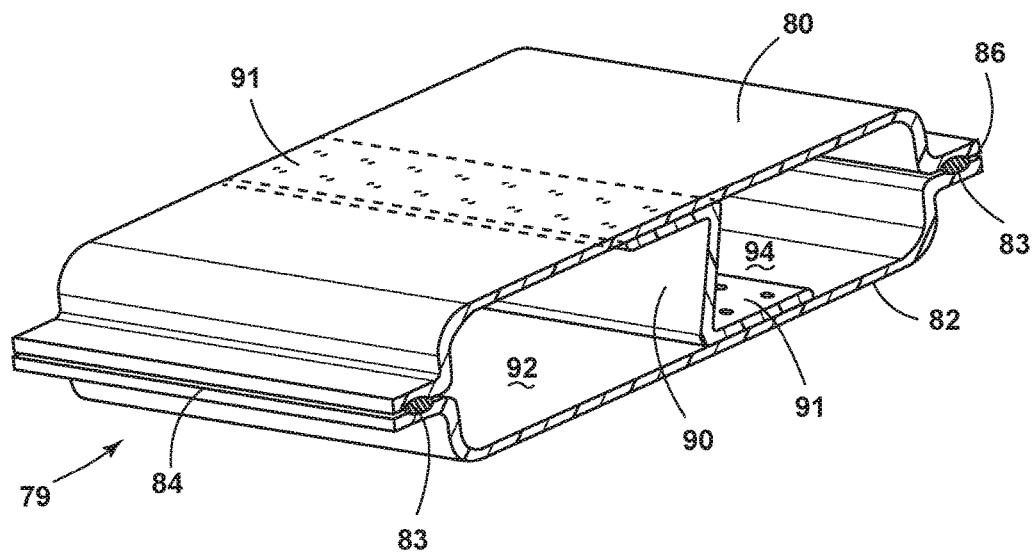
FIG. 4A is a top perspective exploded view of a fluid cell configuration of the present disclosure.
Figure 4B:
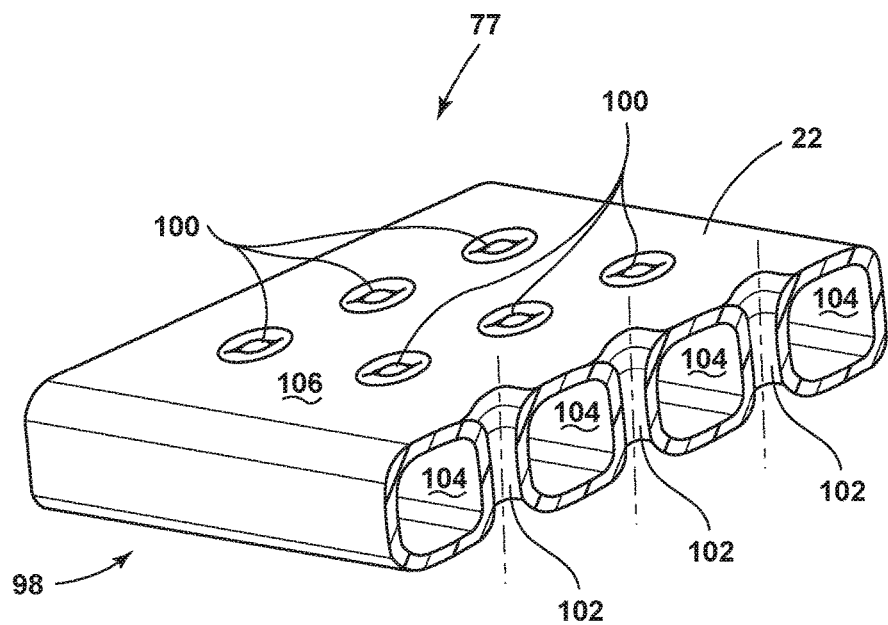
FIG. 4B is a top perspective exploded view of a fluid cell configuration of the present disclosure with ventilation apertures.

With reference now to FIGS. 4A and 4B, it is generally contemplated that multiple configurations may be possible for the structure and manufacture of fluid filled cells that can be used as the base cells 18 or the trim cells 22. FIGS. 4A and 4B generally illustrate two different configurations and manufacturing methods that are offered to construct cells that are inflatable or fillable and which can be used for multiple purposes, including haptic trim panels or providing jounce support, for example. The anti-jounce support can be in the form of an anti-jounce cell 77 disposed in a seat portion of the vehicle seating assembly 12 proximate a rear portion of the seat 40. In the illustrated embodiment of FIG. 4A, a cell construction 79 includes a top sheet 80 and a bottom sheet 82 of impermeable material are sonically welded at welding areas 83 on a first side 84 and a second side 86. A central support member 90 is disposed between the top sheet 80 and the bottom sheet 82 and generally acts as a barrier preventing fluid in a front cell 92 from entering a rear cell 94 and fluid in the rear cell 94 from entering the front cell 92. The central support member 90 includes connection portions 91. The connecting portions 91 may be secured with an inside surface of the top sheet 80 and the bottom sheet 82 via a variety of connecting methods, including, but not limited to, sonic welding, thermal welding, adhesive bonding, etc. Although only one central support member 90 is shown, multiple central support members may be positioned in the seat 40 or the seatback 42. In addition, the central support members 90 may or may not include apertures to allow for movement of fluid between the front and rear cells 92, 94. Further, the central support members 90 may include varying rigidities and flexibilities, such that the central support members 90 may provide structural support inside the front and rear cells 92, 94, may limit movement of fluid between the front and rear cells 92, 94, or a combination of the same. The material from which the front and rear cells 92, 94 can be constructed may vary depending on the application.

FIG. 4B generally illustrates another cell construction 98 is shown, wherein ventilation apertures 100 are in communication with elongate channels 102 that extend through cells 104, but which are not in fluid communication with the fluid inside the cells 104. Stated differently, the cells 104 are filled or partially filled with one fluid at one pressure, while another fluid is blown through the apertures 100 or drawn through the apertures 100 from a seating surface 106. This cell construction of FIG. 4B is generally contemplated for use at the trim cell 22 level, but it is also contemplated that it could be used for use as the base cell 18 with a similar construction disposed above the base cell 18 and used as the trim cell 22. It will also be contemplated that the channels 102 may be positioned between some, but not all, of the cells 104. Alternatively, the cell construction 98 may not include any channels 102 or may include a channel 102 between every cell 104. It is also contemplated that the cells 104 may include different dimensions. For example, the cells 104 disposed on a seat in an area proximate the buttocks or legs of an occupant may include larger channels 102 than cells 104 that are on a periphery of the seat 40.

Figure 5:
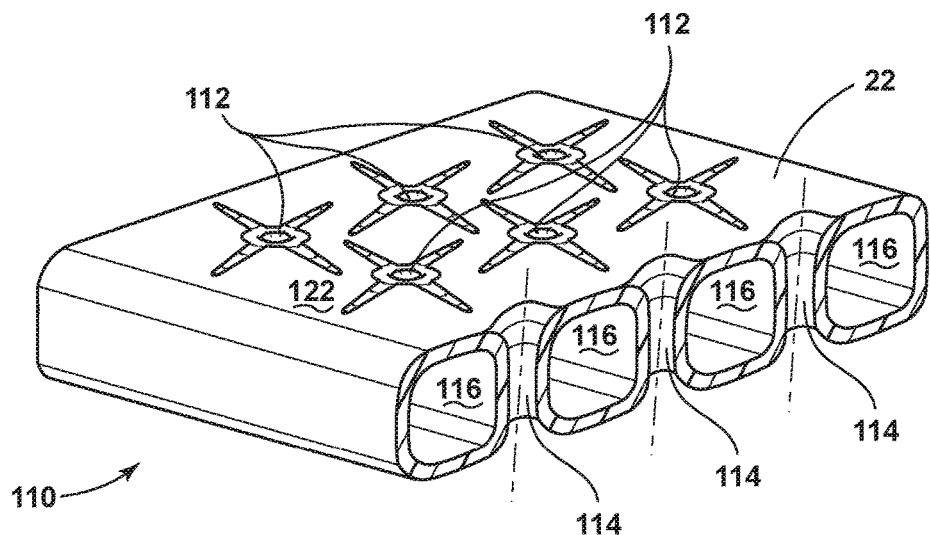
FIG. 5 is a top perspective view of a trim cell configuration of the present disclosure.
Figure 6:
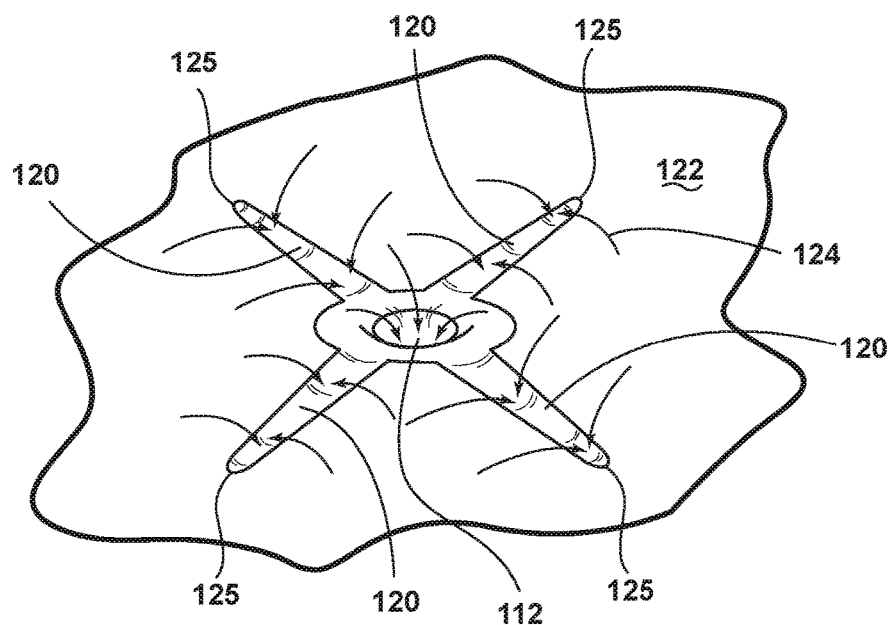
FIG. 6 is a top perspective view of one embodiment of a ventilation aperture of the present disclosure.

FIGS. 5 and 6 generally illustrate a variation of the cell construction 98 of FIGS. 4A and 4B. In FIG. 5, a cell configuration 110 includes a plurality of ventilation apertures 112 that are in communication with elongate channels 114 that extend through a plurality of cells 116. However, the cell construction 110 also includes surface grooves 120 that are disposed on a top surface 122 of the plurality of cells 116. The surface grooves 120 are generally in communication with the plurality of ventilation apertures 112, which extend into and through the plurality of cells 116. This construction is generally a good configuration for the trim cells 22 where air is drawn from a seating surface 122, as generally denoted by arrows 124, or be blown outward from the plurality of ventilation apertures 112. The introduction of the surface grooves 120 provides a larger area for air to be drawn into the plurality of ventilation apertures 112 or blown out of the plurality of ventilation apertures 112, thus covering a larger area of the seating surface 122 and providing a more comfortable seating experience to the occupant. Although four surface grooves 120 are shown around each aperture 112, it will be understood that one or more surface grooves 120 may be present. Further, the surface grooves 120 may have varying dimensions. As illustrated, the surface grooves 120 taper toward a distal end 125 of each of the surface grooves 120. However, the surface grooves 120 could flare or maintain a constant width. In addition, the depth and curvature of the surface grooves 120 could be adjusted depending on desired flow rates. The surface grooves 120 could have a rounded bottom, a V-shaped bottom, a square bottom, etc.

Figure 7:
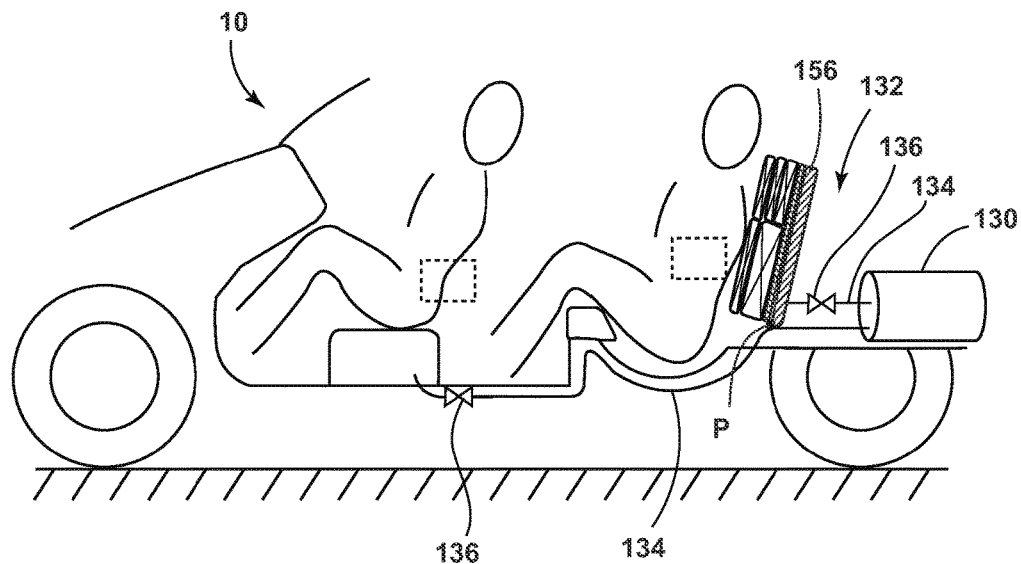
FIG. 7 is a side schematic view of one seatback configuration of the present disclosure with the seatback reclined.
Figure 8:
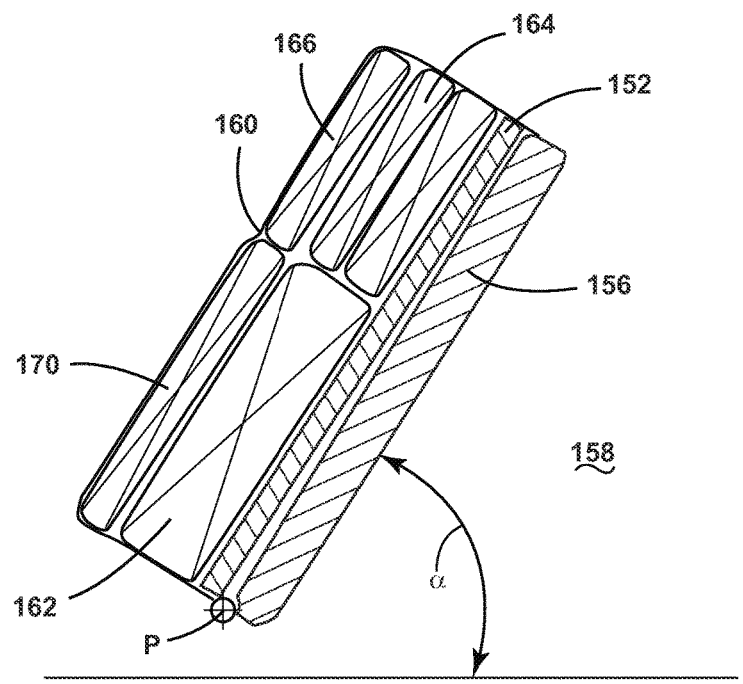
FIG. 8 is a side elevational view of one embodiment of a vehicle seatback of the present disclosure.

With reference now to FIGS. 7 and 8, schematic views of a vehicle seating assembly arrangement are illustrated. It will be understood that although different reference numerals may be used for components of this vehicle seating arrangement, features previously disclosed in relation to trim cells, base cells, etc. can also be applied here. For example, any of the cell constructions in FIGS. 4A-6 could be used in the vehicle seating assembly 12, as illustrated in FIGS. 7 and 8. In the illustrated embodiment, a pump 130 is disposed in a rear portion 132 of the vehicle 10, and is generally controllable from a forward portion of the vehicle 10 by an occupant that is sitting in the vehicle seating assembly 12 to which the pump 130 is coupled. It is generally contemplated that multiple pumps 130 may be used for each seat, or that one pump 130 may be used to supply fluid to each of the vehicle seating assemblies 12. In this instance, a line 134 is generally provided from the fluid pump 130 to each of the vehicle seating assemblies 12, and a valve 136 controls delivery of fluid to the vehicle seating assembly 12 or removal of fluid from the vehicle seating assembly 12 to the pump 130.

With reference again to FIG. 8, a vehicle seatback 150 is supported on an adjustable seatback panel 152 that is pivotally coupled at a pivot line P with a static base panel 156. The static base panel 156 is generally fixed inside the vehicle 10. It is generally contemplated that the static base panel 156 may define both a portion of the seatback 42 and a trunk area 158 of the vehicle 10. However, the adjustable seatback support panel 152 may be rotated about the pivot line P, thereby allowing different reclination angles of a seating surface 160 relative to the seat 40. In this instance, a large lower base cell 162 is shown below smaller upper base cells 163, 164, and 165. In addition, the upper and lower seatbacks include upper trim cells 166, 167, 168, lower trim cells 170, and pivot cells, which will be disclosed in more detail below. The trim cells 166, 168 may include any of the constructions previously discussed, and may be configured to provide climate control at the seating surface, different levels of firmness, among other possible features.

Figure 9:
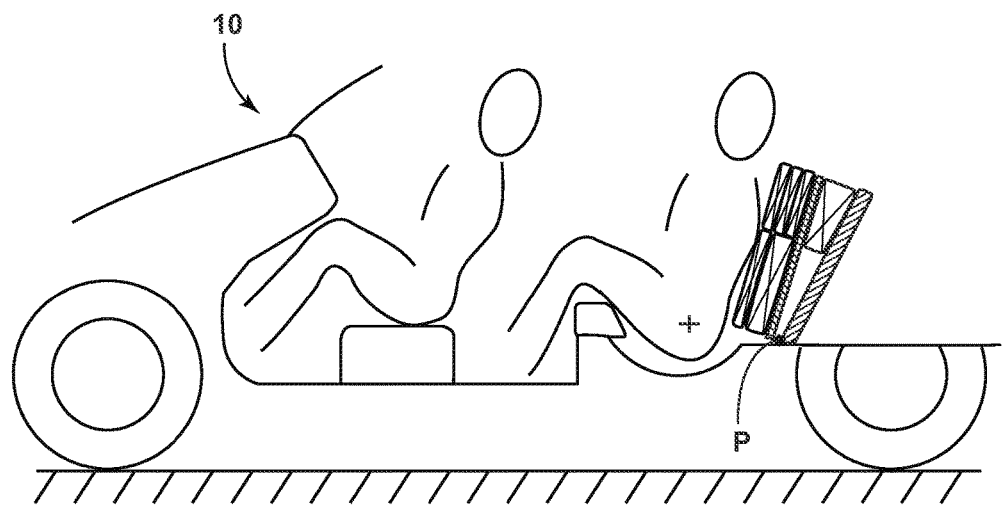
FIG. 9 is a side schematic view of the seatback configuration of FIG. 7 with the seatback reclined.
Figure 10:
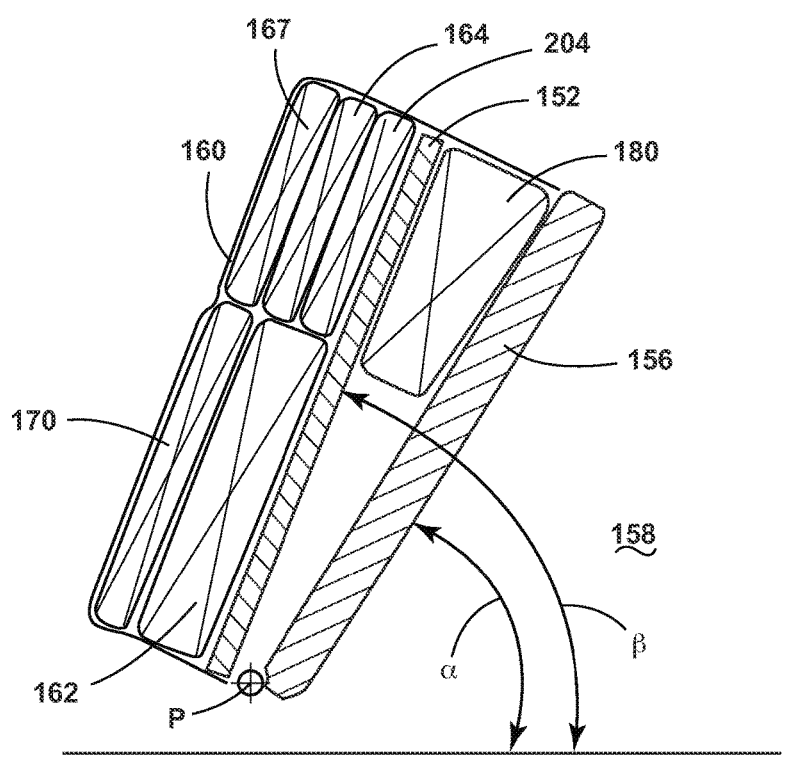
FIG. 10 is a side elevational view of the vehicle seatback of FIG. 8 with the seatback surface rotated forward.
Figure 11:
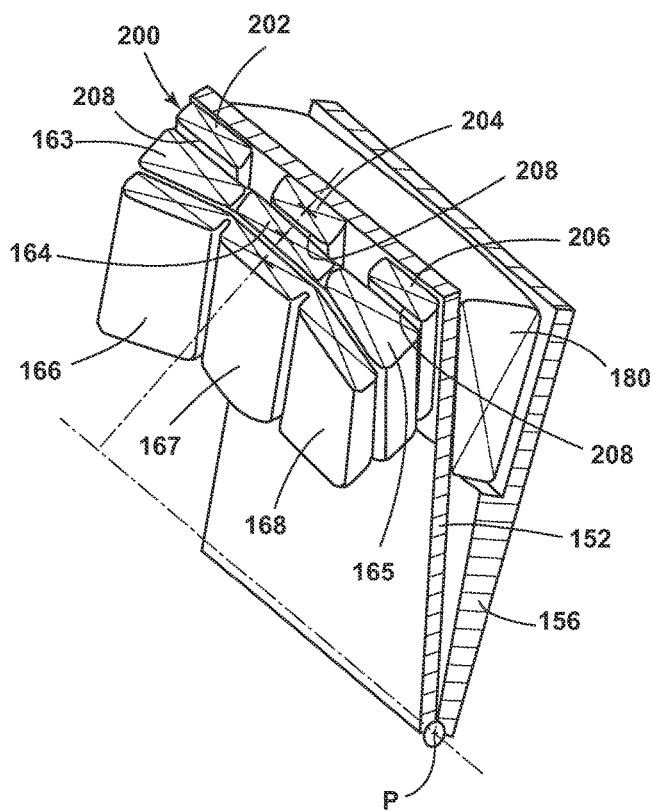
FIG. 11 is a front perspective view of one embodiment of a seatback support panel including side pivot cells with the seatback in a standard position.

With reference now to FIGS. 9 and 10, for example, any of the cell constructions in FIGS. 4A-6 could be used in the vehicle seating assembly 12, as illustrated in FIGS. 7 and 8. As illustrated in FIGS. 9 and 10, the seating surface 160 is rotated about pivot line P by introduction of fluid into an adjustable reclination cell 180. The reclination cell 180 includes a generally frustum-shaped cross-section (FIG. 10). However, the reclination cell 180 could take on a variety of shapes and configurations. In addition, the reclination cell 180 may be secured to the static base panel 156 in a variety of manners using fasteners, adhesive, etc. Alternatively, the reclination cell 180 may rest on a step defined in the static base panel 156 (FIG. 11). The adjustable reclination cell 180 is disposed between the static base panel 156 and the adjustable seatback support panel 152 proximate an upper portion of the static base panel 156 and the adjustable seatback support panel 152. The reclination cell 180 is adjustable between an inflatable condition that pivots the adjustable seatback support panel 152 forward and a deflated condition that pivots the adjustable seatback support panel 152 rearward. As a result, the reclination angle of the seating surface 160 of the seatback relative to the seat 40 can be adjusted.

With reference to FIG. 10, the static base panel 156 is generally disposed at a first reclination angle $\alpha$. As previously noted, the static base panel 156 may be used to generally separate a trunk space from an occupant space in the vehicle 10. The adjustable seatback support panel 152 is adjustable about pivot line P to various angles $\beta$, depending on the reclination angle desired by the occupant. Notably, depending on the adjusted firmness of the trim cells 166, 167, and 168, as well as the lower trim cells 170, the angle of the back of the occupant can be further influenced. It will be generally understood that the base cells 163, 164, and 165 will maintain a general volume of fluid. However, in some instances, the base cells 163, 164, and 165 may be adjustable to accommodate occupants of different heights and/or weights.

Figure 12:
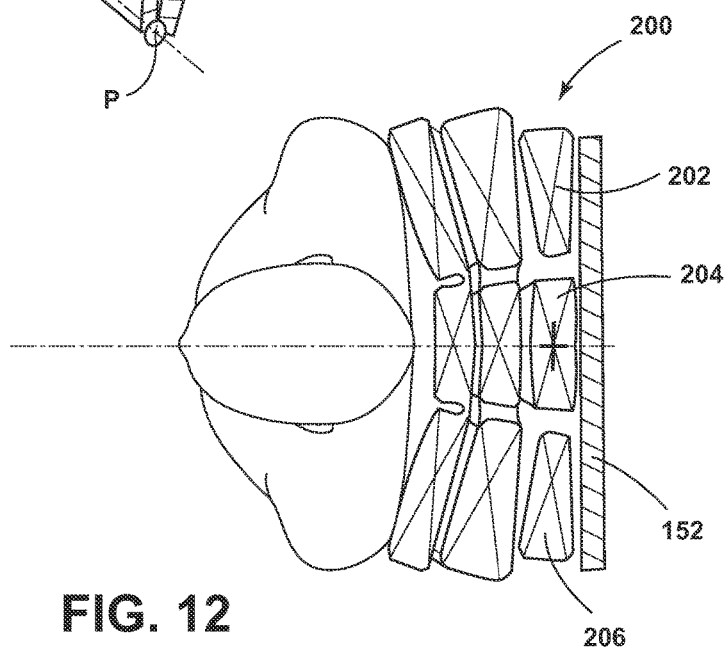
FIG. 12 is a top plan view of the vehicle seatback of FIG. 11.

With reference now to FIGS. 11 and 12, the vehicle seating assembly is illustrated having side pivot cells 200 that are disposed between the adjustable seatback support panel 152 and the base cells 164. The side pivot cells 200 allow for lateral flexibility of the seating surface 160 relative to the adjustable seatback support panel 152. The side pivot cells 200 accomplish this movement by expanding, contracting, or changing shape, depending on where the loading occurs. The loading will typically be associated with an occupant leaning to one side and applying body weight to that side of the seat 40. Consequently, the upper trim cells 166 proximate a first side of the seatback 42 move closer to the adjustable seatback support panel 152, while the upper trim cells 166 proximate a second side (the side that is not loaded) of the seatback 42 move away from the adjustable seatback support panel 152. It is generally contemplated that the side pivot cells 200 include a fixed or a variable volume of fluid, and that the side pivot cells 200 are constructed from a flexible, elastic material.

Figure 13:
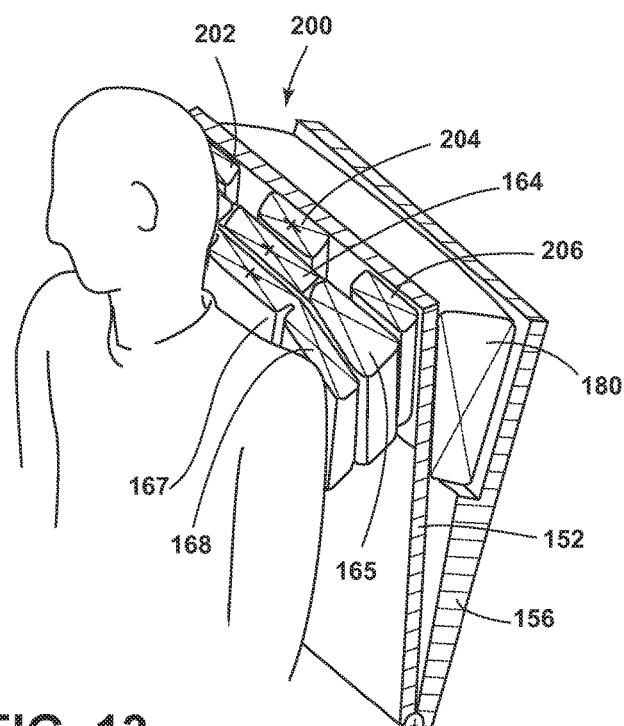
FIG. 13 is a front perspective view of a seatback with an occupant tilted laterally to one side.
Figure 14:
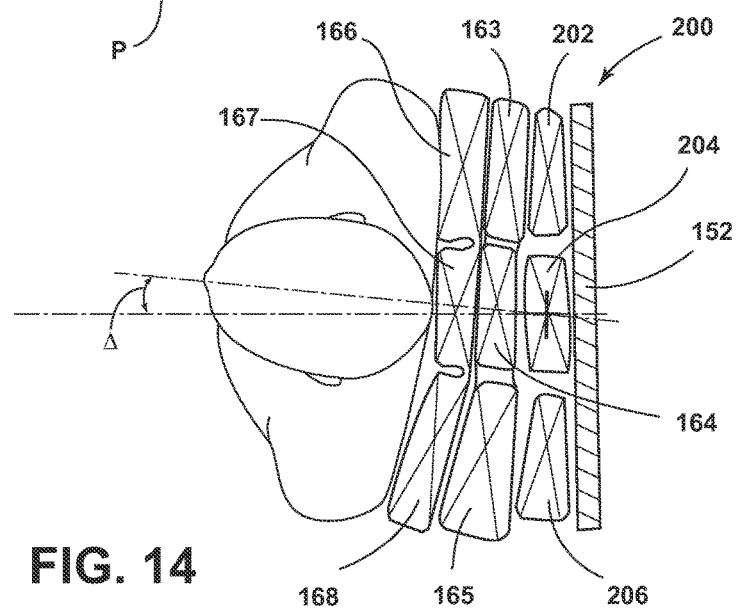
FIG. 14 is a top plan view of a seatback with an occupant tilted laterally to one side.

As shown in FIGS. 13 and 14, an occupant is free to turn or rotate while seated, and the seatback 42 will accommodate such rotation and not feel rigid against the back of the occupant. With reference to FIG. 14, an occupant can rotate slightly while seated and the seating surface 160 will rotate with the occupant. In the illustrated embodiment, the occupant rotates to an angle $\Delta$ and the seating surface 160 conforms to the posture of the occupant and the angle of the back of the occupant. The side pivot cells 200 generally include a first side pivot cell 202, a middle pivot cell 204, and a second side pivot cell 206. Rotation generally occurs about a point proximate the middle pivot cell 204. However, the first side pivot cell 202, the second side pivot cell 206, and the middle pivot cell 204 all include elastically deformable walls 208 that stretch under a general application of positive air pressure. In addition, the side pivot cells 200 are generally illustrated as being at an upper portion of the vehicle seatback 42.

The various cells discussed herein may take on a variety of constructions and shapes. In addition, the cells may be formed from a variety of materials, depending on the desired application.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a frame;
   a seat cushion assembly comprising:
      a plurality of closed base cells disposed on the frame, each base cell having a fixed volume of fluid disposed therein;
      a plurality of trim cells disposed on the base cells and having a variable volume of fluid disposed therein, the trim cells being in communication with a fluid pump; and
      a coverstock disposed over the trim cells, the trim cells further defining a plurality of elongate channels configured to communicate air between a climate control system and a seating surface of the coverstock.

2. The vehicle seating assembly of claim 1, further comprising:
   an anti-jounce cell disposed below the plurality of closed base cells.

3. The vehicle seating assembly of claim 1, wherein a plurality of ventilation apertures are in communication with elongate channels that extend through the plurality of trim cells.

4. The vehicle seating assembly of claim of claim 1, further comprising:
   surface grooves disposed on a top surface of the plurality of trim cells, the surface grooves being in communication with the plurality of elongate channels.

5. The vehicle seating assembly of claim 1, wherein the plurality of trim cells are also in communication with one another.

6. The vehicle seating assembly of claim 1, wherein the plurality of closed base cells include central support members disposed therein.

7. The vehicle seating assembly of claim 1, wherein the plurality of closed base cells include forward base cells and rearward base cells, and wherein the rearward base cells have a greater depth than the forward base cells.

8. A cushion assembly for a vehicle seating assembly comprising:
   a plurality of closed base cells;
   an anti-jounce cell disposed below the base cells proximate a rear portion of the cushion assembly;
   a plurality of open trim cells disposed on the base cells and in communication with a fluid pump; and
   a coverstock disposed over the trim cells, the trim cells further including ventilation apertures in communication with a seating surface of the coverstock.

9. The cushion assembly of claim 8, wherein the anti-jounce cell is disposed in a seat portion of the cushion assembly proximate a rear portion of the seat portion.

10. The cushion assembly of claim 8, wherein the anti-jounce cell includes an arcuate configuration.

11. The cushion assembly of claim 8, wherein the ventilation apertures are in communication with elongate channels that extend through the plurality of open trim cells.

12. The cushion assembly of claim 8, further comprising:
    surface grooves disposed on a top surface of the plurality of open trim cells, the surface grooves being in communication with the ventilation apertures.

13. The cushion assembly of claim 8, wherein the plurality of open trim cells are also in communication with one another.

14. The cushion assembly of claim 8, wherein the plurality of closed base cells include support members disposed therein.

15. The cushion assembly of claim 8, wherein the plurality of closed base cells include forward base cells and rearward base cells, and wherein the rearward base cells have a greater depth than the forward base cells.

16. A cushion assembly for a vehicle seating assembly comprising:
    a plurality of closed base cells disposed on a frame, each base cell having a fixed volume of fluid disposed therein;
    a plurality of open trim cells disposed on the base cells and in communication with a fluid pump; and
    a coverstock disposed over the trim cells, the trim cells further including ventilation apertures configured to move air proximate a seating surface of the coverstock.

17. The cushion assembly of claim 16, further comprising:
    an anti-jounce cell disposed below the plurality of closed base cells.

18. The cushion assembly of claim 17, wherein the anti-jounce cell is disposed in a seat portion of the cushion assembly proximate a rear portion of the seat portion.

19. The cushion assembly of claim 16, wherein the ventilation apertures are in communication with elongate channels that extend through the plurality of open trim cells.

20. The cushion assembly of claim 16, further comprising:
    surface grooves disposed on a top surface of the plurality of open trim cells, the surface grooves being in communication with the ventilation apertures.

* * * * *